United States Patent
Ryu et al.

(10) Patent No.: US 12,525,681 B2
(45) Date of Patent: Jan. 13, 2026

(54) BATTERY MODULE, BATTERY PACK, AND VEHICLE

(71) Applicant: LG ENERGY SOLUTION, LTD., Seoul (KR)

(72) Inventors: Sang-Woo Ryu, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 531 days.

(21) Appl. No.: 18/024,005

(22) PCT Filed: Nov. 22, 2021

(86) PCT No.: PCT/KR2021/017205
§ 371 (c)(1),
(2) Date: Feb. 28, 2023

(87) PCT Pub. No.: WO2022/124636
PCT Pub. Date: Jun. 16, 2022

(65) Prior Publication Data
US 2023/0268610 A1 Aug. 24, 2023

(30) Foreign Application Priority Data
Dec. 7, 2020 (KR) .......... 10-2020-0169920

(51) Int. Cl.
*H01M 50/289* (2021.01)
*H01M 50/143* (2021.01)
(Continued)

(52) U.S. Cl.
CPC ....... *H01M 50/358* (2021.01); *H01M 50/143* (2021.01); *H01M 50/271* (2021.01); *H01M 2220/20* (2013.01)

(58) Field of Classification Search
None
See application file for complete search history.

(56) References Cited

U.S. PATENT DOCUMENTS

| 8,236,437 B2 | 8/2012 | Kim et al. | |
| 2009/0325040 A1* | 12/2009 | Saito | H01M 10/12 |
| | | | 429/53 |

(Continued)

FOREIGN PATENT DOCUMENTS

| CN | 110574189 A | 12/2019 |
| CN | 111183532 A | 5/2020 |

(Continued)

OTHER PUBLICATIONS

International Search Report for PCT/KR2021/017205 mailed on Mar. 2, 2022.

(Continued)

*Primary Examiner* — Yoshitoshi Takeuchi
(74) *Attorney, Agent, or Firm* — Birch, Stewart, Kolasch & Birch, LLP

(57) ABSTRACT

A battery module includes a cell assembly including a plurality of battery cells, a lower case having an open upper portion and including an accommodating space, an upper case coupled to the lower case and including a connection hole to communicate with the accommodating space, an upper cover coupled to the upper case, forming a buffering space between the upper cover and the upper case by being spaced apart from the upper case, and including a discharge hole perforated such that the buffering space communicates with the outside, a partition member located in the buffering space to form a movement path extending from the connection hole to the discharge hole, and a coupling member located on the movement path, configured to be coupled to the partition member, and including a movement space formed by perforating a body of the coupling member.

12 Claims, 10 Drawing Sheets

(51) Int. Cl.
*H01M 50/207* (2021.01)
*H01M 50/244* (2021.01)
*H01M 50/271* (2021.01)
*H01M 50/291* (2021.01)
*H01M 50/298* (2021.01)
*H01M 50/358* (2021.01)
*H01M 50/507* (2021.01)
*H01M 50/514* (2021.01)
*H01M 50/529* (2021.01)

(56) References Cited

U.S. PATENT DOCUMENTS

| | | | |
|---|---|---|---|
| 2010/0178552 A1* | 7/2010 | Kim | H01M 50/358 429/175 |
| 2011/0171505 A1 | 7/2011 | Kishll et al. | |
| 2012/0164490 A1 | 6/2012 | Itoi et al. | |
| 2016/0141573 A1 | 5/2016 | Aoki et al. | |
| 2016/0254510 A1 | 9/2016 | Fujimoto et al. | |
| 2018/0108892 A1 | 4/2018 | Kim et al. | |
| 2019/0097192 A1 | 3/2019 | Kim et al. | |
| 2020/0067045 A1* | 2/2020 | Takano | H01M 50/342 |
| 2020/0227708 A1 | 7/2020 | Ahn et al. | |
| 2020/0280035 A1 | 9/2020 | Park et al. | |
| 2020/0395643 A1 | 12/2020 | Seo et al. | |
| 2021/0083244 A1 | 3/2021 | Cho et al. | |
| 2021/0280949 A1* | 9/2021 | Kim | H01M 50/213 |
| 2021/0351455 A1* | 11/2021 | Kim | B60L 50/66 |
| 2021/0351470 A1* | 11/2021 | Uemura | B60L 50/64 |
| 2023/0231244 A1 | 7/2023 | Cho et al. | |
| 2024/0030517 A1 | 1/2024 | Seo et al. | |
| 2024/0243427 A1* | 7/2024 | Ryu | H01M 50/383 |
| 2025/0273810 A1* | 8/2025 | Ryu | H01M 50/20 |

FOREIGN PATENT DOCUMENTS

| | | | |
|---|---|---|---|
| CN | 111373597 A | 7/2020 | |
| CN | 111527626 A | 8/2020 | |
| JP | 34-20130 Y | 12/1959 | |
| JP | 2001-84981 A | 3/2001 | |
| JP | 2008-34291 A | 2/2008 | |
| JP | 2011-65906 A | 3/2011 | |
| JP | 2011-70872 A | 4/2011 | |
| JP | 2018-527704 A | 9/2018 | |
| KR | 10-2012-0049839 A | 5/2012 | |
| KR | 10-2012-0090027 A | 8/2012 | |
| KR | 10-1998224 B1 | 7/2019 | |
| KR | 10-2030726 B1 | 10/2019 | |
| KR | 10-2033101 B1 | 10/2019 | |
| KR | 10-2061872 B1 | 1/2020 | |
| WO | WO-2010101536 A1 * | 9/2010 | H01M 50/262 |
| WO | WO 2018/123573 A1 | 7/2018 | |
| WO | WO 2020/026963 A1 | 2/2020 | |
| WO | WO 2020/153015 A1 | 7/2020 | |

OTHER PUBLICATIONS

Extended European Search Report for European Application No. 21903682.9, dated Feb. 22, 2024.

* cited by examiner

BATTERY MODULE, BATTERY PACK, AND VEHICLE

TECHNICAL FIELD

The present disclosure relates to a battery module, a battery pack including the battery module, and a vehicle, and more particularly, to a battery module having high safety against fire or explosion.

The present application claims priority to Korean Patent Application No. 10-2020-0169920 filed on Dec. 7, 2020 in the Republic of Korea, the disclosures of which are incorporated herein by reference.

BACKGROUND ART

Recently, as demand for portable electronic products such as notebook computers, video cameras, and portable telephones is rapidly increasing, and development of electric vehicles, energy storage batteries, robots, satellites, etc. is in full swing, research into high-performance battery cells capable of being repeatedly charged and discharged is being actively conducted.

Currently commercialized battery cells include nickel-cadmium batteries, nickel-hydrogen batteries, nickel-zinc batteries, and lithium battery cells. Among them, compared to nickel-based battery cells, lithium battery cells have almost no memory effect and thus are freely charged and discharged and have a very low self-discharge rate and have a high energy density.

These lithium battery cells mainly use a lithium-based oxide and a carbon material as a positive electrode active material and a negative electrode active material, respectively. In addition, such a lithium battery cell includes an electrode assembly in which a positive electrode plate and a negative electrode plate respectively coated with a positive electrode active material and a negative electrode active material are disposed with a separator interposed therebetween, and an outer casing for sealingly accommodating the electrode assembly together with an electrolyte, that is, a battery case.

Moreover, depending on the shape of the outer casing, lithium battery cells may be classified into a can-type battery cell in which an electrode assembly is embedded in a metal can and a pouch-type battery cell in which an electrode assembly is embedded in a pouch of an aluminum laminate sheet.

In particular, demand for large-capacity battery modules applied to electric vehicles and the like has recently increased. Because this large-capacity battery module includes a plurality of battery cells, when a fire or explosion occurs in the plurality of battery cells, flames and high-temperature gas are emitted, and thus the fire spreads to other battery modules in a vehicle due to explosion, other adjacent devices are damaged, or passengers are injured. Accordingly, there is a need for a method for increasing the safety of a battery module against fire or gas explosion.

DISCLOSURE

Technical Problem

The present disclosure is designed to solve the problems of the related art, and therefore the present disclosure is directed to providing a battery module having high safety against fire or explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including:
- a cell assembly including a plurality of battery cells;
- a lower case having an open upper portion and including an accommodating space in which the cell assembly is accommodated;
- an upper case coupled to the lower case to cover the open upper portion of the lower case and including a connection hole to communicate with the accommodating space;
- an upper cover coupled to the upper case to cover an upper portion of the upper case, forming a buffering space between the upper cover and the upper case by being spaced apart from the upper case, and including a discharge hole such that the buffering space communicates with the outside;
- at least one partition member located in the buffering space to form a movement path extending from the connection hole to the discharge hole and having a shape extending in a horizontal direction; and
- a coupling member located on the movement path, configured to be coupled to the at least one partition member, and including a movement space formed by perforating a body of the coupling member from a first side to a second side of the body.

The coupling member may include:
- an exterior part having a plurality of first slits extending from a first side of the exterior part to a second side of the exterior part and including an insertion space formed by recessing a portion of the exterior part; and
- an interior part having a plurality of second slits communicating with the plurality of first slits, respectively, each of the plurality of second slits extending from a first side of the interior part to a second side of the interior part, and configured such that at least a first portion of the interior part is inserted into the insertion space and a second portion protrudes from the insertion space.

The at least one partition member may include a coupling portion formed by recessing a portion of the at least one partition member such that at least a portion of the coupling member is inserted thereinto.

The at least one partition member may be at least two partition members.

The coupling member may be disposed between the at least two partition members.

The exterior part may be inserted into the coupling portion formed in a first partition member from among the at least two partition members.

The interior part may be inserted into the coupling portion formed in a a second partition member among the at least two partition members.

When the at least two partition members are arranged in contact with each other,
a first portion of the coupling member may be inserted into the coupling portion of a first partition member of the at least two partition members, and a second portion of the coupling member may be inserted into the coupling portion of a second partition member of the at least two partition members.

The at least one partition member may include an extension configured to protrude from an end of the at least one partition member in an extension direction.

The at least one partition member may also include a fixing groove configured such that one a first end of the extension is inserted, in the end-inserted in the extension direction.

The extension may be configured such that a portion of the extension is slidable while being inserted into the fixing groove.

At least one of the upper cover and the upper case may include an insertion groove configured such that a second end of the extension in the extension direction is inserted thereinto.

In one aspect of the present disclosure, there is provided a battery pack including at least one battery module described above.

In one aspect of the present disclosure, there is provided a vehicle including at least one battery pack described above.

The coupling member may have an exterior part having a groove and an interior part having a protrusion fitting within the groove, the interior part slidable relative to the exterior part.

Advantageous Effects

According to an aspect of the present disclosure, a buffering space is formed by an upper cover and an upper case within the upper cover and the upper case, and a partition member and a coupling member both forming a movement path, through which gas and flame move, in the buffering space are included, and thus, when a plurality of battery cells of a cell assembly of a battery module explode or are ignited, generated flame and gas may interfere with or contact the coupling member while moving along the movement path of the buffering space, and the flame may be extinguished and the pressure of the generated gas may be effectively lowered.

Moreover, according to the present disclosure, the generated gas may provide a significantly reduced gas pressure and a significantly reduced gas temperature while passing through a movement space of the coupling member included in the movement path of the buffering space. In other words, according to the present disclosure, damage to an external device or human life that may occur when high-temperature gas or flame is directly discharged from the battery module without a conventional partition member may be reduced. In other words, the battery module according to the present disclosure may effectively reduce a degree to which the generated gas or flame is ejected to the outside. Ultimately, the battery module may effectively reduce external damage caused by explosion or fire of a plurality of battery cells.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
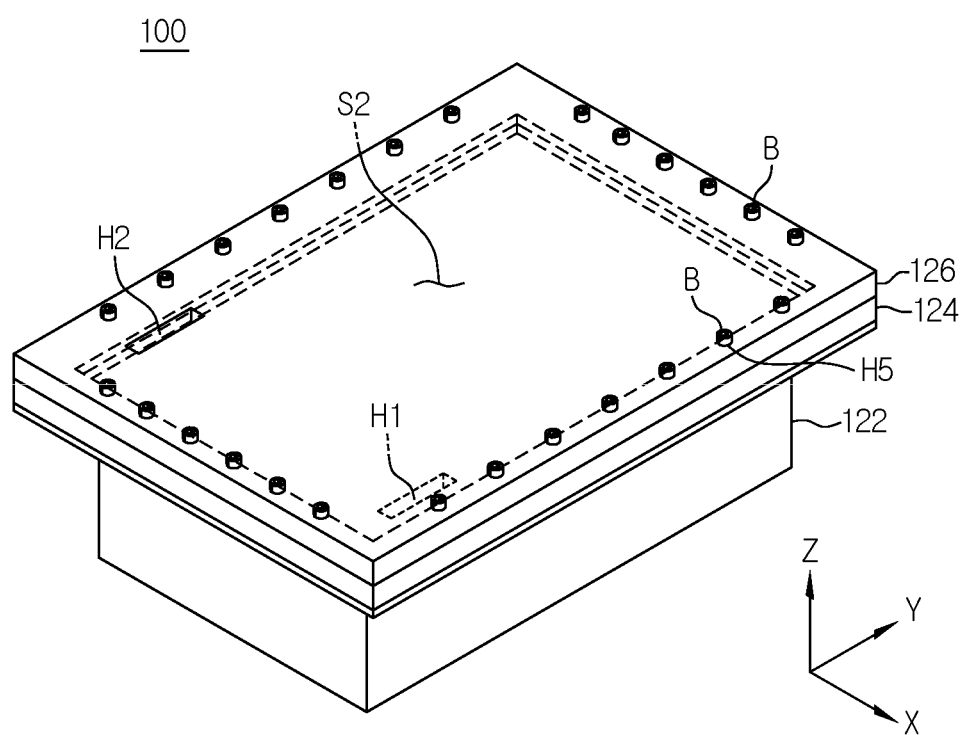
FIG. 1 is a schematic perspective view of a battery module according to an embodiment of the present disclosure.
Figure 2:
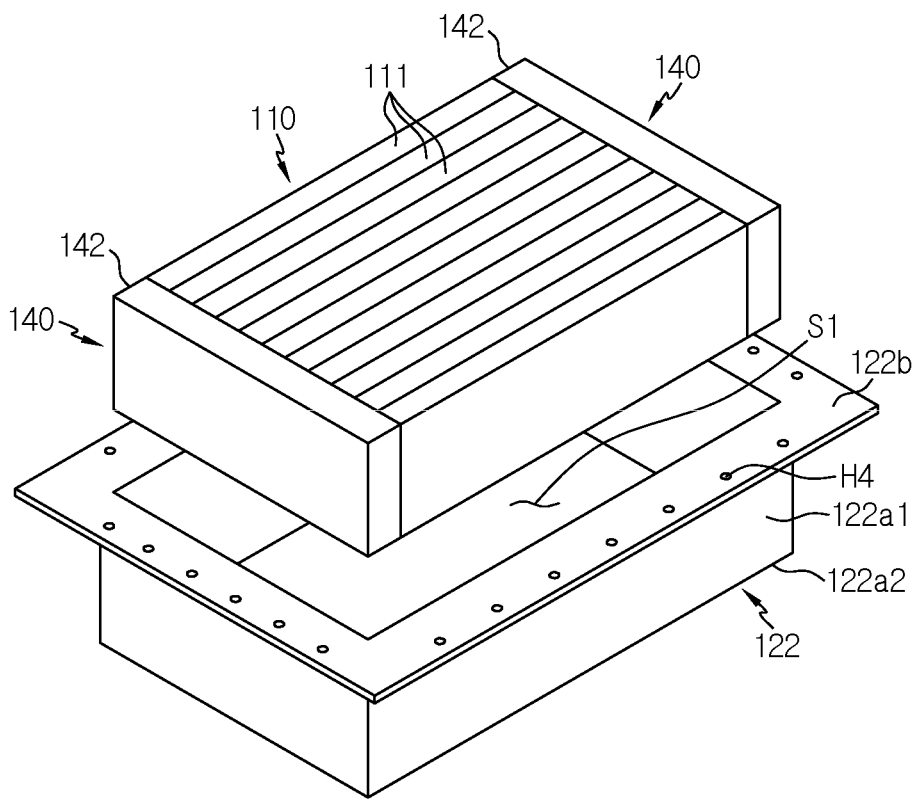
FIG. 2 is a schematic exploded perspective view of some components of a battery module according to an embodiment of the present disclosure.
Figure 3:
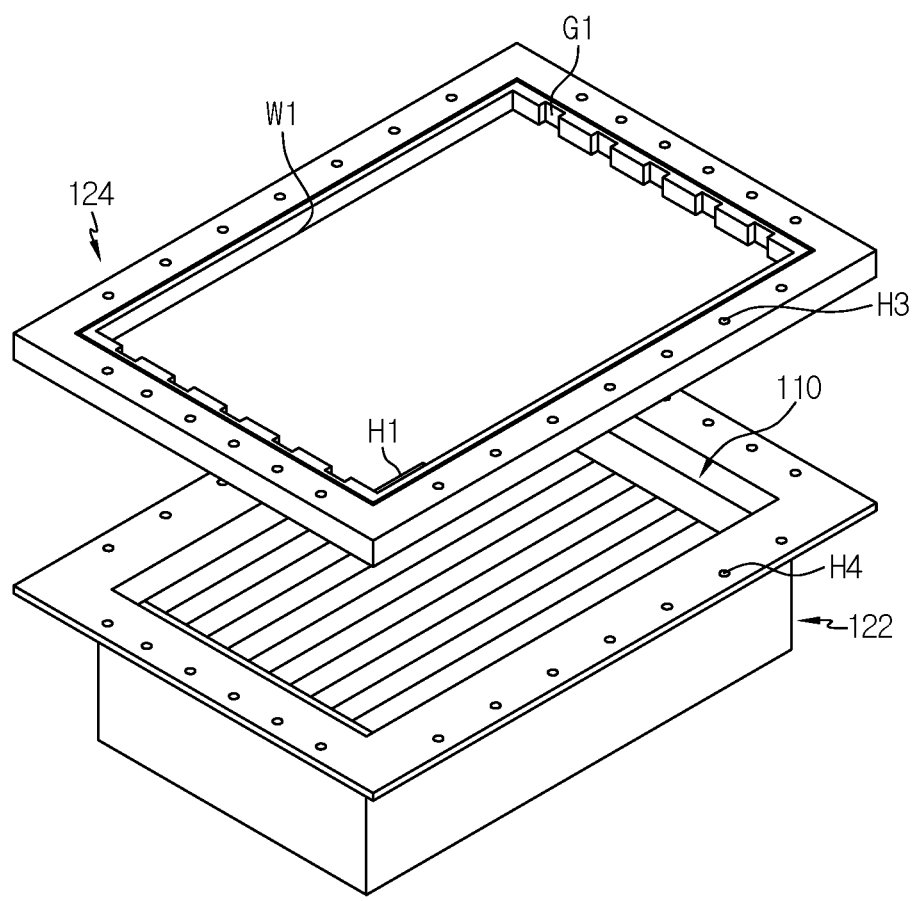
FIG. 3 is a schematic exploded perspective view of some components of a battery module according to an embodiment of the present disclosure.
Figure 4:
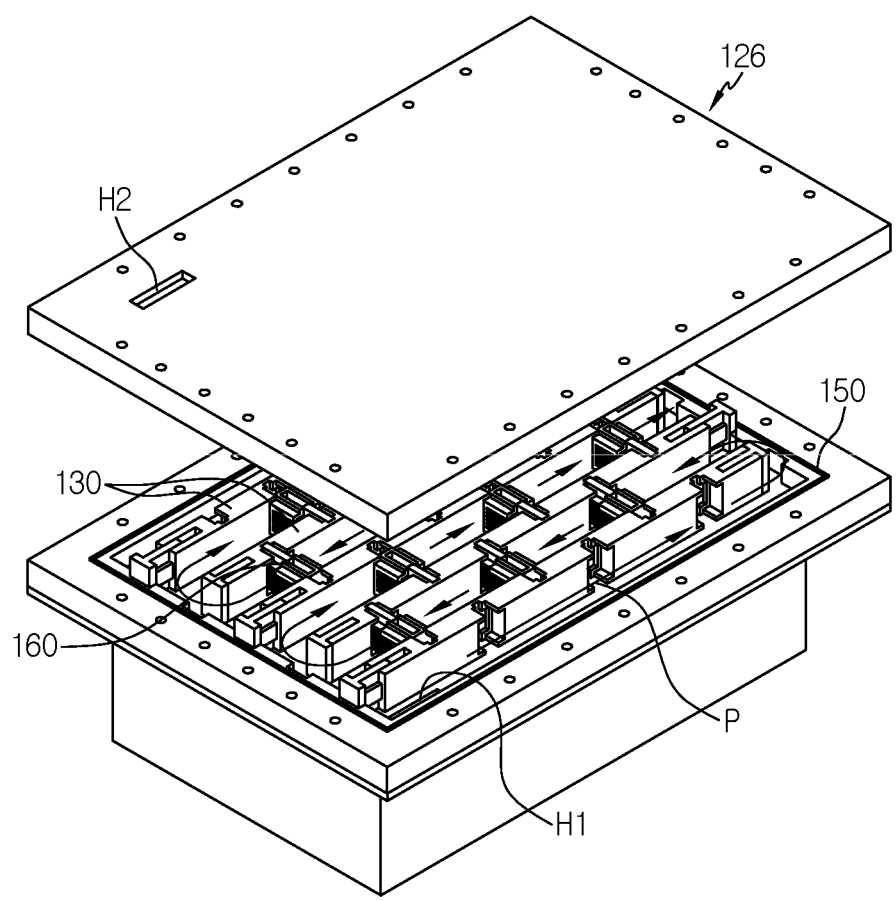
FIG. 4 is a schematic perspective view of some components of a battery module according to an embodiment of the present disclosure.

FIG. 1 is a schematic perspective view of a battery module according to an embodiment of the present disclosure. FIG. 2 is a schematic exploded perspective view of some components of a battery module according to an embodiment of the present disclosure. FIG. 3 is a schematic exploded perspective view of some components of a battery module according to an embodiment of the present disclosure. FIG. 4 is a schematic perspective view of some components of a battery module according to an embodiment of the present disclosure. In FIG. 1, a front-back direction is expressed in negative and positive directions of a Y-axis, a left-right direction is expressed in negative and positive directions of an X-axis, and a top-bottom direction is expressed in positive and negative directions of a Z-axis.

Referring to FIGS. 1 through 5, a battery module 100 according to an embodiment of the present disclosure includes a cell assembly 110 including a plurality of battery cells 111, a lower case 122, an upper case 124, an upper cover 126, at least one partition member 130, and at least one coupling member 160.

In detail, the battery cells 111 may be, for example, pouch-type battery cells 111. For example, as shown in FIG. 3, the cell assembly 110 may include 21 pouch-type battery cells 111 stacked on one another side by side in one direction (X-axis direction). For example, each of the pouch-type battery cells 111 may include an electrode lead (not shown) on each of front and rear ends thereof. For example, each of the pouch-type battery cells 111 may include a positive electrode lead on the front end and a negative electrode lead on the rear end.

However, the configuration of the battery cell 111 of the battery module 100 according to the present disclosure is not limited to the above-described pouch-type battery cell 111, and various types of battery cells 111 known at the time of filing of the present disclosure may be employed.

Busbar assemblies 140 may be provided in front of and at rear of the cell assembly 110, respectively. The busbar assemblies 140 may be configured to electrically connect the plurality of battery cells 111. For example, the busbar assemblies 140 may include busbars (not shown) configured to contact the electrode leads of the plurality of battery cells 111, and busbar frames 142 configured to mount the busbars thereon. The busbars may include, for example, metals such as aluminum, copper, and nickel. The busbar frames 142 may include, for example, an electrically insulating material. The electrically insulating material may be, for example, polyvinyl chloride.

The lower case 122 may include an accommodating space S1 in which the cell assembly 110 is accommodated. In other words, the lower case 122 may have a rectangular box shape having an open upper portion. For example, as shown in FIG. 2, the lower case 122 may include a sidewall portion 122a1 in a vertical direction and a lower wall 122a2 coupled to the bottom of the sidewall portion 122a1, in order to form an accommodating space S1 having a size corresponding to the cell assembly 110. The lower case 122 may include a flange portion 122b extending in the horizontal direction from an upper end of the sidewall portion 122a1. In the flange portion 122b, a plurality of second bolt holes H4 may be formed at predetermined intervals along its outer periphery. The flange portion 122b may be bolt-coupled to the upper case 124 through the second bolt holes H4.

The upper case 124 may have a plate shape extending in the horizontal direction to cover the open upper portion of the lower case 122. The upper case 124 may be configured to be coupled to the flange portion 122b of the lower case 122. To this end, the upper case 124 may have a plurality of first bolt holes H3 formed on its outer periphery in the horizontal direction. The upper case 124 may also be configured to be coupled to the upper cover 126. The upper case 124 may include a gasket 150 formed on its upper portion. The gasket 150 may be configured to prevent gas from escaping to the outside through a coupling surface between the upper case 124 and the upper cover 126. In other words, the gasket 150 may be interposed between the upper case 124 and the upper cover 126.

As shown in FIG. 1, the upper cover 126 may have a plate shape extending in the horizontal direction to cover the upper portion of the upper case 124. A plurality of third bolt holes H5 spaced apart from each other at predetermined intervals may be formed on an outer periphery of the upper cover 126 in the horizontal direction.

For example, as shown in FIG. 1, the upper cover 126 may be coupled to the upper portion of the upper case 124, and the lower portion of the upper case 124 is coupled with the flange portion 122b of the lower case 122. At this time, a plurality of bolts B may penetrate through the third bolt holes H5 of the upper cover 126, the first bolt holes H3 of the upper case 124, and the bolt holes H4 of the lower case 122. The bolts B may be screw-coupled to the bolt holes H3, H4, and H5. Alternatively, after the bolts B are inserted into the bolt holes H3, H4, and H5, nuts may be inserted into a lower portion of a body to be fastened and fixed.

Figure 5:
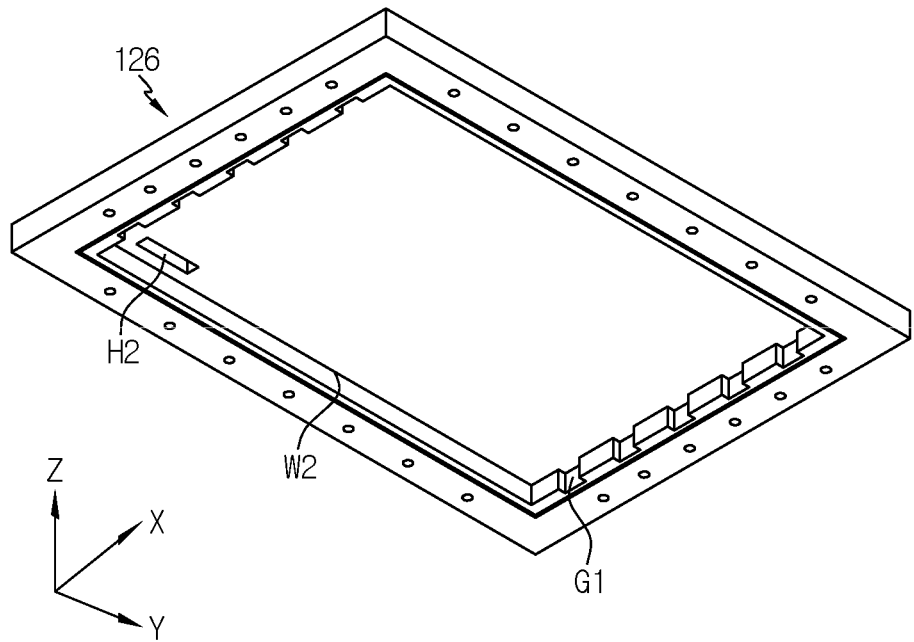
FIG. 5 is a schematic bottom perspective view of an upper cover of a battery module according to an embodiment of the present disclosure.
Figure 6:
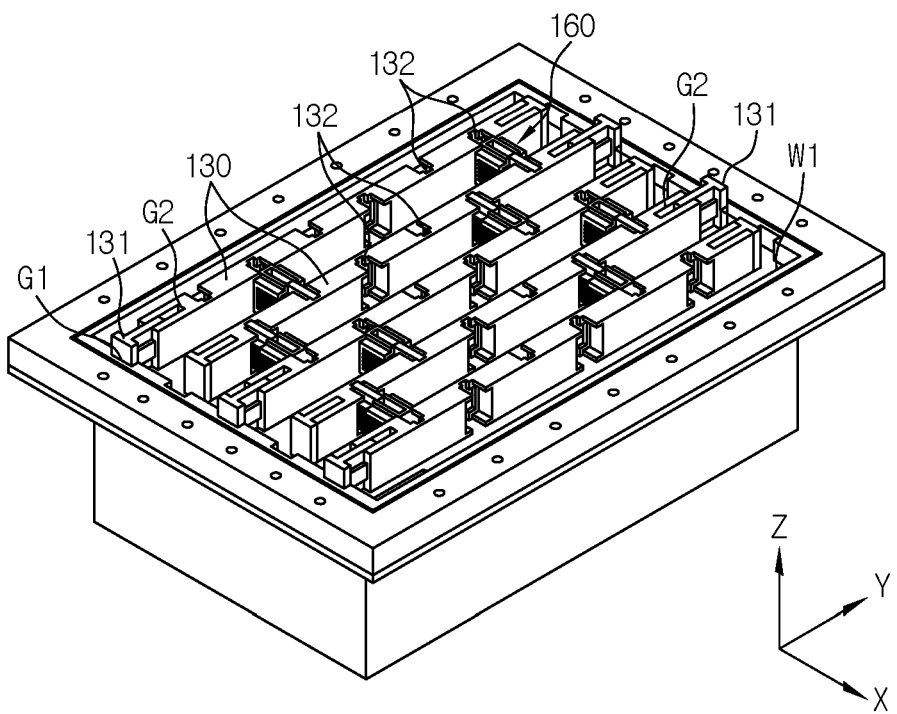
FIG. 6 is a schematic perspective view of some components of a battery module according to an embodiment of the present disclosure.

FIG. 5 is a schematic bottom perspective view of an upper cover of a battery module according to an embodiment of the present disclosure. FIG. 6 is a schematic perspective view of some components of a battery module according to an embodiment of the present disclosure.

Referring to FIGS. 5 and 6 in conjunction with FIGS. 1 through 4, a portion of the upper case 124 may be perforated to form a connection hole H1 to communicate with the accommodating space S1. The upper case 124 may include a buffering space S2 formed due to a portion of the lower case 122 being spaced apart from the upper case 124. For example, the buffering space S2 may be formed by recessing one or more surfaces of the upper case 124 and the upper cover 126 at which the upper case 124 and the upper cover 126 face each other. For example, to form the buffering space S2, a portion of a lower surface of the upper cover 126 may have a portion W2 recessed in an upward direction, and a portion of an upper surface of the upper case 124 may have a portion W1 recessed in a downward direction.

A portion of the upper cover 126 may be perforated so that the buffering space S2 and the outside communicate with each other, and thus a discharge hole H2 may be formed. In other words, in the battery module 100 according to the present disclosure, when thermal runaway or fire occurs in the cell assembly 110 and gas is generated from the cell assembly 110, the generated gas may flow from the accommodating space S1 into the buffering space S2 via the connection hole H1 of the upper case 124. The gas introduced into the buffering space S2 may be exhausted to the outside via the discharge hole H2 of the upper cover 126.

At least one partition member 130 may be included in the buffering space S2. The partition member 130 may be configured to form a movement path P extending from the connection hole H1 to the discharge hole H2 in the buffering space S2. In other words, the partition member 130 may be configured to partition the buffering space S2. The partition member 130 may have a shape extending in the horizontal direction in the buffering space S2. For example, as shown in FIG. 4, five partition members 130 may each have a shape extending in the front-back direction. In other words, the partition members 130 may be configured to prevent movement of the gas in the left-right direction (X-axis direction) and induce movement of the gas in the front-back direction (Y-axis direction).

For example, as shown in FIG. 6, the present disclosure may include at least two partition members 130. For example, as shown in FIG. 6, the battery module 100 according to the present disclosure may include five partition members 130. One of the at least two partition members 130 may be disposed to be biased toward one side (front side) of the buffering space S2 with respect to the center of the buffering space S2, and the other partition member 130 may be disposed to be biased toward the other side (rear side) of the buffering space S2.

In other words, as shown in FIG. 4, in the battery module 100, when the movement path P of the buffering space S2 is set in a zigzag shape, one partition member 130 may be disposed biased toward one end of the buffering space S2 to form a gas or flame passage on the other end of the buffering space S2, and another adjacent partition member 130 may be disposed biased toward the other end of the buffering space S2 to form a gas or flame passage on the one end of the buffering space S2.

The partition members 130 may be located in the buffering space S2. The partition members 130 may be configured to form the movement path P extending from the connection hole H1 to the discharge hole H2. For example, as shown in FIG. 6, the battery module 100 according to the present disclosure may include five partition members 130. The partition members 130 may each have a shape extending in the horizontal direction. For example, as shown in FIG. 6, the partition members 130 may each have a shape extending in the front-back direction.

The coupling member 160 may be located on the movement path P. The coupling member 160 may be configured to be coupled to the partition members 130. For example, as shown in FIG. 6, a portion of the coupling member 160 is inserted into grooves of the partition members 130 such that the partition members 130 and the coupling member 160 may be coupled to each other. The coupling member 160 may include a movement space formed due to perforation from one side of the body to the other side thereof. For example, when gas and flame are generated due to fire or explosion of the cell assembly 110, the gas and the flame may move through the movement path P formed by the partition members 130. At this time, when the gas and the flame moving along the movement path P meet the coupling member 160, the gas and the flame may pass through the movement space. Accordingly, the present disclosure may effectively reduce the pressure and temperature of generated high-temperature gas, and effectively shorten a movement distance of the flame.

Thus, according to this structure of the present disclosure, because the buffering space S2 is formed by the upper cover 126 and the upper case 124 within the upper cover 126 and the upper case 124 and the partition member 130 and the coupling member 160 both forming the movement path P through which gas and flame move in the buffering space S2 are included, when the plurality of battery cells 111 of the cell assembly 110 of the battery module 100 explode or are ignited, generated flame and gas may interfere with or contact the coupling member 160 while moving along the movement path P of the buffering space S2, and thus the flame may be extinguished and the pressure of the generated gas may be effectively lowered.

Moreover, according to the present disclosure, the generated gas may provide a significantly reduced gas pressure and a significantly reduced gas temperature while passing through the movement space of the coupling member 160 included in the movement path P of the buffering space S2. In other words, according to the present disclosure, damage to an external device or human life that may occur when high-temperature gas or flame is directly discharged from the battery module 100 without a conventional partition member 130 may be reduced. In other words, the battery module 100 according to the present disclosure may effectively reduce a degree to which the generated gas or flame is ejected to the outside. Ultimately, the battery module 100 may effectively reduce external damage caused by explosion or fire of the plurality of battery cells 111. Accordingly, according to the present disclosure, the safety of the battery module 100 may be greatly improved.

Figure 7:
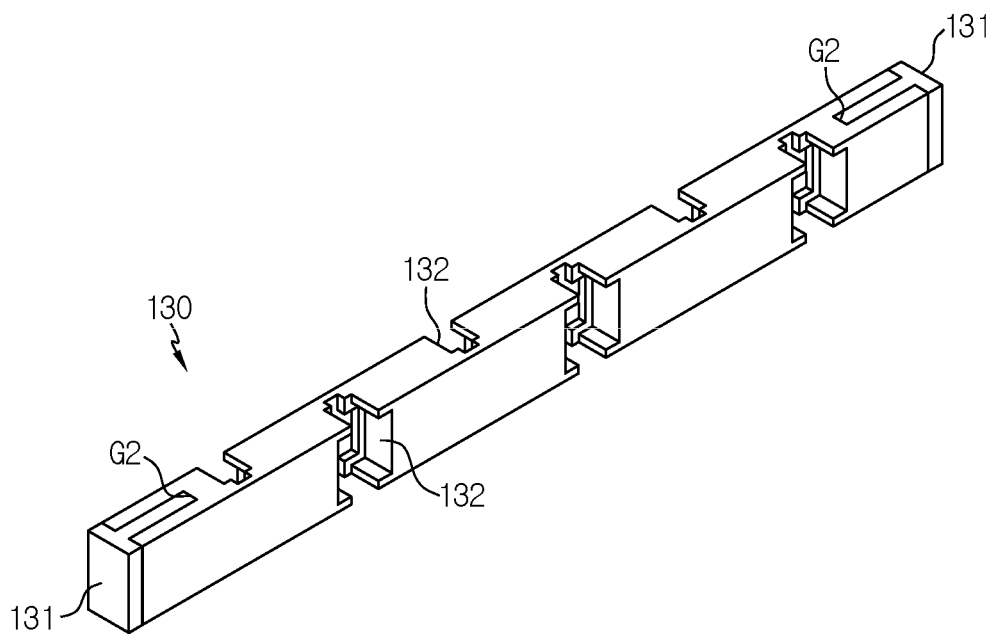
FIG. 7 is a schematic perspective view of a partition member and a coupling member of a battery module according to an embodiment of the present disclosure.
Figure 8:
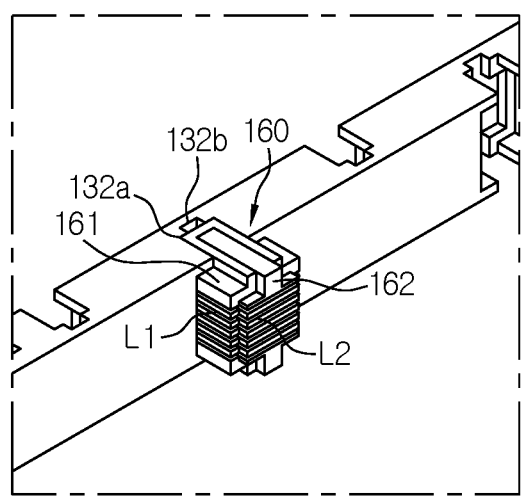
FIGS. 8 and 9 are schematic partial perspective views of portions of a partition member and a coupling member of a battery module according to an embodiment of the present disclosure.
Figure 9:
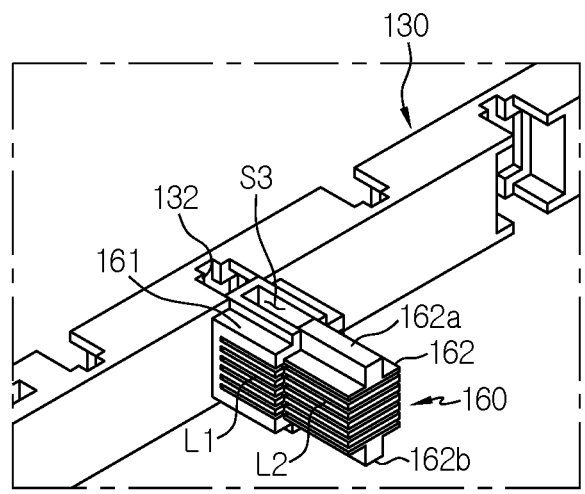
Figure 10:
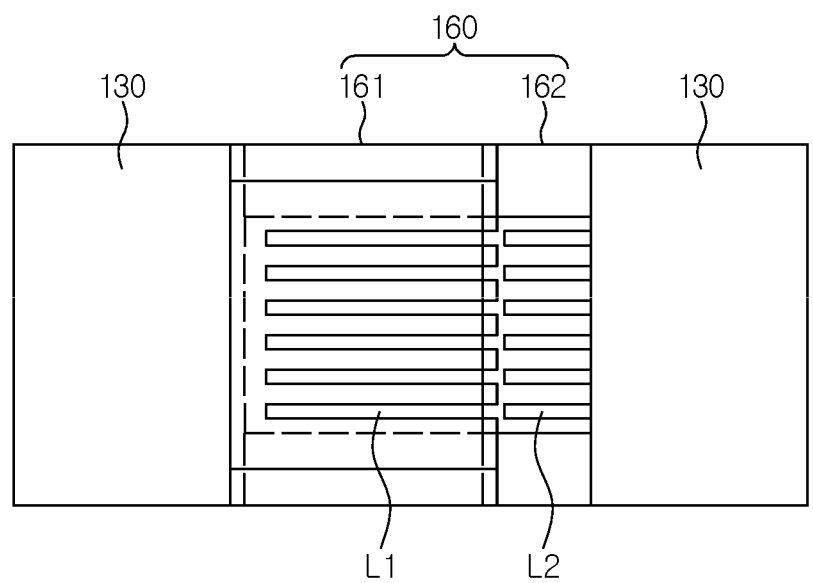
FIG. 10 is a schematic front view of a partition member and a coupling member of a battery module according to an embodiment of the present disclosure.

FIG. 7 is a schematic perspective view of a partition member and a coupling member of a battery module according to an embodiment of the present disclosure. FIGS. 8 and 9 are schematic partial perspective views of portions of a partition member and a coupling member of a battery module according to an embodiment of the present disclosure. FIG. 10 is a schematic partial perspective view of a portion of a partition member of a battery module according to an embodiment of the present disclosure.

Referring to FIGS. 7 through 10, the coupling member 160 may include an exterior part 161 and an interior part 162. The exterior part 161 may include a plurality of first slits L1 formed therein. Each of the plurality of first slits L1 may have a shape extending from one side of the body of the exterior part 161 to the other side of the body. For example, the exterior part 161 may have an approximately hexahedral body. Each of the plurality of first slits L1 may have a shape extending from a front side of the hexahedral body to a rear side of the hexahedral body. The exterior part 161 may be provided with an insertion space S3 formed by recessing a portion of the exterior part 161. The insertion space S3 may be configured to allow insertion and discharge of the interior part 162. The insertion space S3 may have a size corresponding to at least a portion of the interior part 162.

The interior part 162 may include a plurality of second slits L2 formed therein. Each of the plurality of second slits L2 may have a shape extending from one side of the body of the interior part 162 to the other side of the body. For example, the exterior part 161 may have an approximately hexahedral body. Each of the plurality of second slits L2 may have a shape extending from a front side of the hexahedral body to a rear side of the hexahedral body. The interior part 162 may be configured to be slidable while being inserted into the insertion space S3 of the exterior part 161. For example, referring to FIG. 8, the interior part 162 may be completely accommodated in the insertion space S3 of the exterior part 161. Referring to FIG. 9, the interior portion 162 may be arranged such that at least a portion thereof protrudes from the insertion space S3 of the exterior portion 161 in a right direction (positive direction of the X-axis).

The interior part 162 may include a first protrusion 162a protruding upward from an upper surface of the body, and a second protrusion 162b protruding downward from a lower surface of the body. The first protrusion 162a and the second protrusion 162b may be configured to be inserted into the insertion space S3 of the exterior part 161. The first protrusion 162a and the second protrusion 162b may also be configured to be inserted into a coupling portion 132 to be described later.

Therefore, according to this configuration of the present disclosure, due to the inclusion of the exterior part 161 and the interior part 162 in the coupling member 160 of the present disclosure, gas or flame generated due to a fire or explosion of the cell assembly 110 may pass through the plurality of first slits L1 and the plurality of second slits L2 respectively included in the exterior part 161 and the interior part 162. Accordingly, the present disclosure may effectively reduce the pressure and temperature of generated high-temperature gas, and effectively shorten a movement distance of the flame.

Furthermore, in the present disclosure, because the interior part 162 slides in the left-right direction in the insertion space S3 of the exterior part 161, an overall length of the coupling member 160 in the left-right direction may be adjusted. Accordingly, it is easy to increase or decrease a vertical cross-sectional area of the movement path P, and thus, during fire or explosion of the cell assembly 110, the vertical cross-sectional area of the movement path P through which gas and flame move in the buffering space S2 may be easily set considering an ejection length of the flame and the pressure of the gas. Therefore, it is possible to standardize the partition member 130 and the coupling member 160 of the present disclosure so that both may be applied to battery modules 100 of various capacities. In other words, the present disclosure may reduce manufacturing costs, because there is no need to additionally manufacture the component parts of a new battery module 100 every time a change in the capacity of the cell assembly 110 is necessary.

Figure 11:
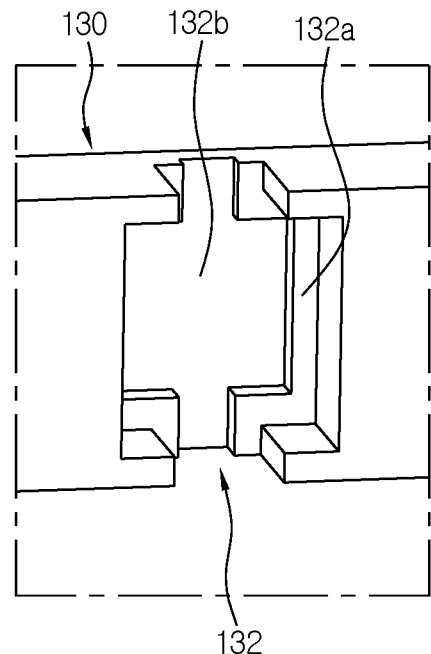
FIG. 11 is a schematic partial perspective view of a portion of a partition member of a battery module according to an embodiment of the present disclosure.

Referring to FIG. 11 in conjunction with FIGS. 8 and 9, the partition member 130 of the battery module 100 according to an embodiment of the present disclosure may include the coupling portion 132, which is formed by recessing of a portion of the partition member 130. The coupling portion 132 may be configured such that at least a portion of the coupling member 160 is inserted. For example, the coupling portion 132 may include an exterior recessed portion 132a recessed such that a portion of the exterior part 161 of the coupling member 160 is inserted. In other words, the exterior recessed portion 132a may have a recessed space with a size corresponding to a portion of the exterior part 161. The coupling portion 132 may also include an interior recessed portion 132b recessed such that a portion of the interior part 162 of the coupling member 160 is inserted. The interior recessed portion 132b may be formed by being further recessed from the exterior recessed portion 132a. In other words, the interior recessed portion 132b may have a recessed space with a size corresponding to a portion of the interior part 162.

Furthermore, the coupling member 160 may be configured to be slidable in one direction while being inserted into the recessed space of the coupling portion 132 of the partition member 130. For example, as shown in FIGS. 8 and 9, the coupling member 160 may change its location to various locations by sliding in the right direction (positive direction of the X-axis) while being inserted into the recessed space of the coupling portion 132 of the partition member 130.

Therefore, according to this configuration of the present disclosure, due to the inclusion of the coupling portion 132 configured such that the coupling member 160 is insertable in the partition member 130, a distance by which the coupling member 160 protrudes from the partition member 130 may be easily set. Moreover, according to the present disclosure, it is easy to implement various types of coupling structures between the partition member 130 and the coupling member 160. In other words, according to the present disclosure, the degree of freedom in design is high in configuring the partition member 130 and the coupling member 160. Accordingly, according to the present disclosure, there is no need to additionally manufacture the components of a new battery module 100 according to a change in the capacity of the cell assembly 110, and an optimized battery module 100 capable of effectively reducing the risk is easily manufactured in consideration of explosive power according to the capacity.

Figure 12:
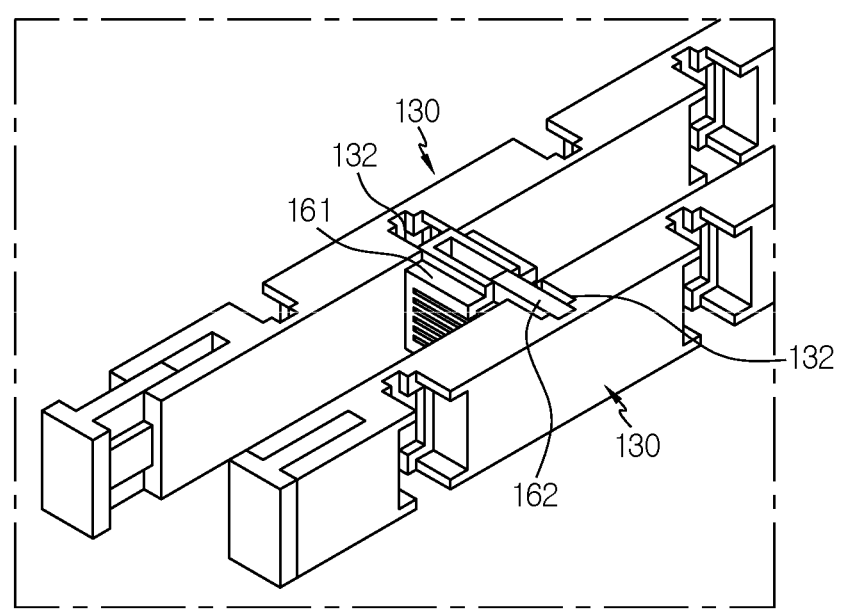
FIG. 12 is a schematic partial perspective view of portions of a partition member and a coupling member of a battery module according to an embodiment of the present disclosure.

FIG. 12 is a schematic partial perspective view of portions of a partition member and a coupling member of a battery module according to an embodiment of the present disclosure.

Referring to FIG. 12 in conjunction with FIG. 6, at least two partition members 130 of the present disclosure may be included. Each of the at least two partition members 130 may include at least one coupling portion 132. The coupling member 160 may be disposed between the at least two partition members 130. In other words, the coupling member 160 may be disposed on a movement path P formed between the at least two partition members 130. In this case, in more detail, the exterior part 161 of the coupling member 160 may be inserted into the coupling portion 132 formed in one partition member 130 from among the at least two partition members 130. The interior part 162 may be configured to be inserted into the coupling portion 132 formed in a remaining coupling member 130. For example, a left portion of the coupling member 160 may be inserted into the coupling portion 132 of a partition member 130 located on the left side from among the at least two partition members 130 and may be fixed to the coupling portion 132. A right portion of the coupling member 160 may be inserted into the coupling portion 132 of a partition member 130 located on the right side from among the at least two partition members 130 and may be fixed to the coupling portion 132.

Therefore, according to this configuration of the present disclosure, when the coupling member 160 is disposed between the at least two partition members 130, both ends of the coupling member 160 may be inserted into and fixed to the respective coupling portions 132 of the at least two partition members 130, and thus, even when the cell assembly 110 explodes, a coupling state between the partition member 130 and the coupling member 160 may be stably maintained.

Figure 13:
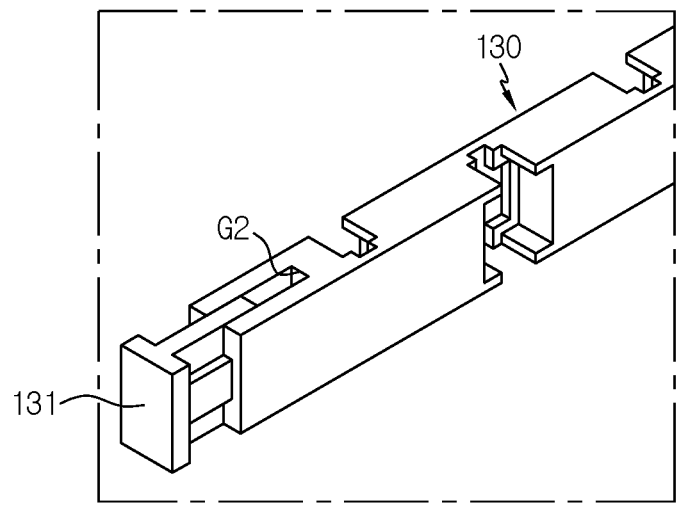
FIG. 13 is a schematic partial perspective view of a partition member and a coupling member of a battery module according to an embodiment of the present disclosure.

FIG. 13 is a schematic partial perspective view of a partition member and a coupling member of a battery module according to an embodiment of the present disclosure.

Referring to FIG. 13 in conjunction with FIGS. 5 through 7, the partition member 130 of the battery module 100 according to the present disclosure may be configured so that its extension length may be adjusted. For example, the partition member 130 may adjust an extension length in the front-back direction (Y-axis direction) according to a set length of the movement path P of gas in the front-back direction. For example, the partition member 130 may include an extension 131 configured to protrude from an end of the partition member 130 in an extension direction. The partition member 130 may also include a fixing groove G2 configured such that one end of the extension 131 is inserted thereinto. The fixing groove G2 may be provided on the end of the partition member 130 in the extension direction. A recessed space of the fixing groove G2 may correspond to the size of the one end of the extension 131. In other words, the extension 131 may be configured such that a portion thereof may slide while being inserted into the fixing groove G2. The extension 131 may have a pillar shape extending in the extension direction of the partition member 130. The pillar shape may have, for example, a cross pillar shape having a cross-shaped cross section.

For example, as shown in FIG. 7, extensions 131 may be provided on front and rear ends of the partition member 130, respectively. The extension 131 provided on the front end may be configured such that a length of the partition member 130 extends forwards. The extension 131 provided on the rear end may be configured such that the length of the partition member 130 extends rearwards.

Therefore, according to this configuration of the present disclosure, the partition member 130 of the battery module 100 of the present disclosure is provided with the extension 131 so that its extension length is adjustable, thereby diversifying a length of the movement path P in the front-rear direction. In other words, according to the present disclosure, the degree of freedom in design of the movement path P formed by the partition member 130 is high. Accordingly, according to the present disclosure, there is no need to additionally manufacture the components of a new battery module 100 according to a change in the capacity of the cell assembly 110, and an optimized battery module 100 capable of effectively reducing the risk is easily manufactured in consideration of explosive power according to the capacity.

Referring back to FIGS. 5, 6, and 13, an insertion groove G1 may be included in at least one of the upper cover 126 and the upper case 124 of the battery module 100. The insertion groove G1 may be configured such that an end of the extension 131 in the extension direction is inserted. In other words, the insertion groove G1 may be configured such that an end of the extension 131 in a protrusion direction is inserted. For example, as shown in FIG. 6, respective extensions of three partition members 130 from among the five partition members 130 may be inserted into insertion grooves G1 provided on the front side of the upper case 124, respectively. Respective extensions of the remaining two partition members 130 may be inserted into insertion grooves G1 provided on the rear side of the upper case 124, respectively.

Therefore, according to this configuration of the present disclosure, due to the formation of the insertion grooves G1 in at least one of the upper cover 126 and the upper case 124, the left-right direction of the partition member 130 may restrict a movement. In other words, according to the present disclosure, the partition member 130 accommodated in the buffering space S2 may be stably fixed, and thus, even when the cell assembly 110 explodes, the arrangement of the partition member 130 may be stably maintained.

Figure 14:
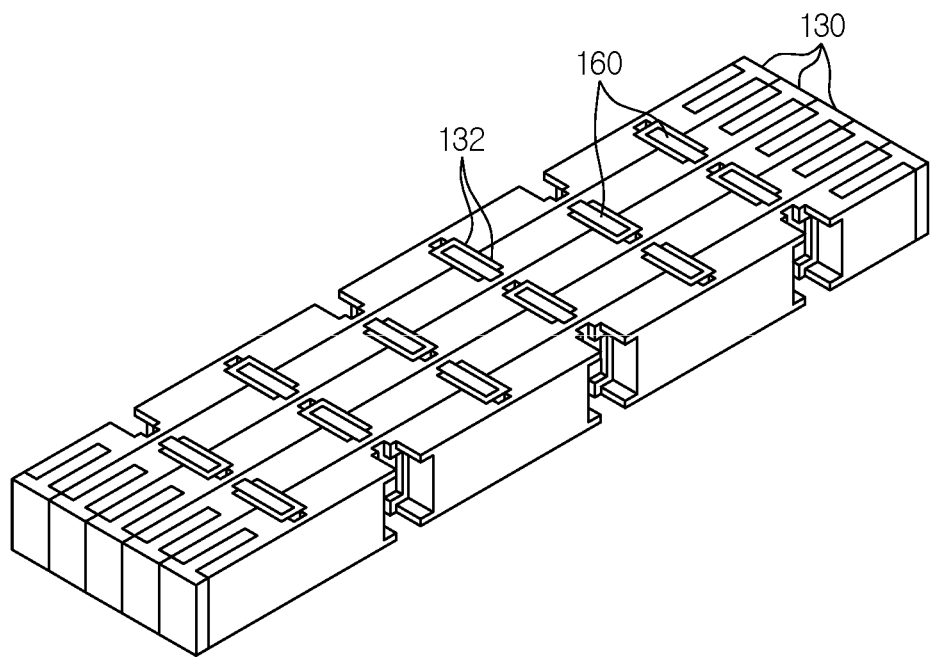
FIG. 14 is a schematic perspective view of a partition member and a coupling member of a battery module according to another embodiment of the present disclosure.

FIG. 14 is a schematic perspective view of a partition member and a coupling member of a battery module according to another embodiment of the present disclosure.

Referring to FIG. 14, a battery module 100 according to another embodiment of the present disclosure may include the at least two partition members 130 arranged in close contact with each other. In other words, one lateral surface or both lateral surfaces of a plurality of partition members 130 may contact another partition member 130. In this case, the coupling member 160 disposed between the two partition members 130 may be configured such that a portion of the coupling member 160 is inserted into an empty space of the coupling portion 132 of one partition member 130 and a remaining portion thereof is inserted into the coupling portion 132 of the other partition member 130. For example, as shown in FIG. 14, the five partition members 130 may be arranged in close contact with each other. In this case, a left portion of each of 12 coupling members 160 may be inserted into the coupling portion 132 of a partition member 130 located on the left side of the coupling member 160, and a right portion of the coupling member 160 may be inserted into the coupling portion 132 of a partition member 130 located on the right side of the coupling members 160.

Accordingly, in the battery module 100 of the present disclosure, when component part storage is needed before the battery module 100 is manufactured, the partition member 130 and the coupling member 160 may be coupled to each other in a state of being in close contact with each other. An effective reduction of the space occupied by the partition member 130 and the coupling member 160 may facilitate storage of members.

Figure 15:
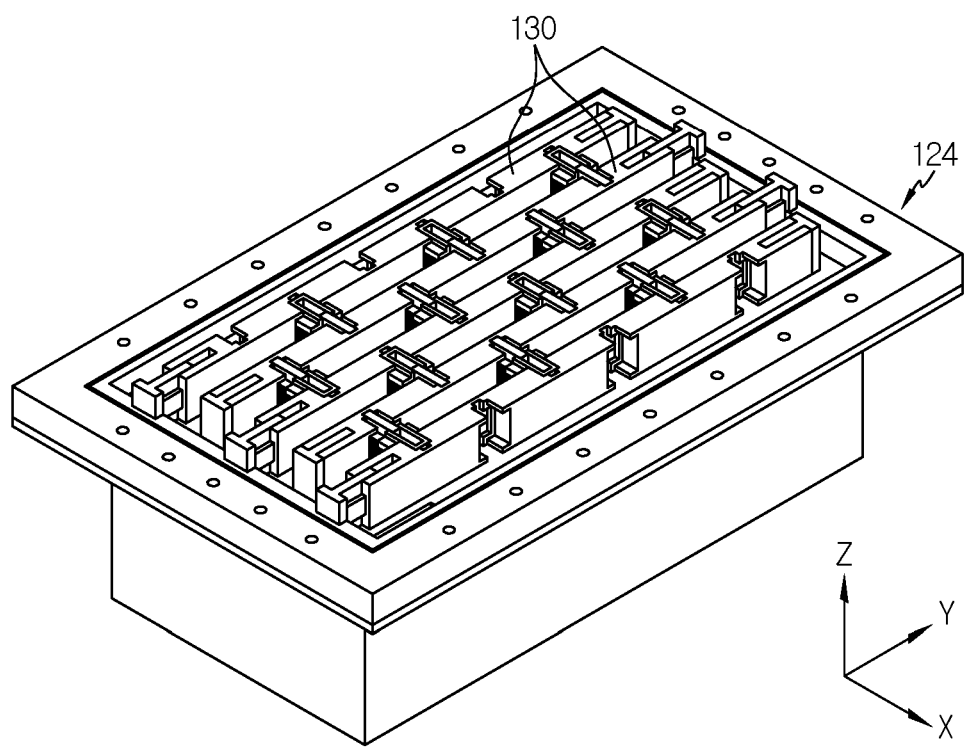
FIG. 15 is a schematic perspective view of some components of a battery module according to another embodiment of the present disclosure.

FIG. 15 is a schematic perspective view of some components of a battery module according to another embodiment of the present disclosure.

Referring to FIG. 15, a battery module 100 according to another embodiment of the present disclosure may have a smaller width in the left-right direction (X-axis direction) than the battery module 100 of FIG. 1. Compared with the battery module 100 of FIG. 1, an interval between a plurality of partition members of the battery module 100 of FIG. 15 in the left-right direction (X-axis direction) may be narrow.

For example, five partition members 130 may be mounted on a recessed portion W1 of the upper case 124 to form a movement path in a zigzag shape in the front-back direction. In this case, the five partition members 130 may be arranged such that their ends are alternately inserted into the insertion grooves G1 formed in the front side of the upper case 124 or the insertion grooves G1 formed in the rear side of the upper case 124.

In addition, according to the present disclosure, when a battery module is larger or smaller than the size of the battery module 100 or when the capacity of a cell assembly is relatively large or relatively small, the vertical cross-sectional area of the movement path may be adjusted by changing the numbers of partition members 130 and coupling members or adjusting the interval between the plurality of partition members.

Meanwhile, a battery pack (not shown) according to an embodiment of the present disclosure includes at least one battery module 100.

The battery pack may further include various devices (not shown) for controlling charging/discharging of the battery module 100, for example, a battery management system (BMS), a current sensor, a fuse, and the like.

Meanwhile, a power storage device (not shown) according to an embodiment of the present disclosure includes at least one battery module 100. The power storage device may include a rack case (not shown) configured to accommodate a battery pack.

The battery pack according to an embodiment of the present disclosure may be included in vehicles such as electric vehicles or hybrid vehicles. In other words, a vehicle according to an embodiment of the present disclosure may include the battery pack according to an embodiment of the present disclosure mounted therein.

Meanwhile, although terms indicating directions such as up, down, left, right, front, and rear are used in the present specification, these terms are only for convenience of description, and it is apparent to those skilled in the art that these terms may vary depending on a position of a target object or a position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| [Description of reference numerals] | |
|---|---|
| 100: battery module | 110: cell assembly |
| 111: battery cell | |
| 122: lower case | 124: upper case |
| 126: upper cover | |
| S1, S2, S3: accommodating space, buffering space, insertion space | |
| H1, H2, H3, H4, H5: connection hole, discharge hole, first bolt hole, second bolt hole, third bolt hole | |
| B: bolt | |
| 130: partition member | P: movement path |
| 131: extension | 132: coupling portion |
| 160: coupling member | 161, 162: exterior part, interior part |
| L1, L2: first slit, second slit | |
| G1, G2: insertion groove, fixing groove | |
| 140, 142: busbar assembly, busbar frame | |

What is claimed is:

1. A battery module comprising:
a cell assembly including a plurality of battery cells;
a lower case having an open upper portion and including an accommodating space in which the cell assembly is accommodated;
an upper case coupled to the lower case to cover the open upper portion of the lower case and comprising a connection hole to communicate with the accommodating space;
an upper cover coupled to the upper case to cover an upper portion of the upper case, forming a buffering space between the upper cover and the upper case by being spaced apart from the upper case, and comprising a discharge hole such that the buffering space communicates with the outside;
at least one partition member located in the buffering space to form a movement path extending from the connection hole to the discharge hole and having a shape extending long in a horizontal direction; and
a coupling member located on the movement path, configured to be coupled to the at least one partition member, and comprising a movement space formed by perforating a body of the coupling member from a first side to a second side of the body.

2. The battery module of claim 1, wherein the coupling member comprises:
an exterior part having a plurality of first slits extending from a first side of the exterior part to a second side of the exterior part and including an insertion space formed by recessing a portion of the exterior part; and
an interior part having a plurality of second slits communicating with the plurality of first slits, respectively, each of the plurality of second slits extending from a first side of a body of the interior part to a second side of the body of the interior part, and configured such that at least a first portion of the interior part is inserted into the insertion space and a second portion protrudes from the insertion space.

3. The battery module of claim 2, wherein the at least one partition member comprises a coupling portion formed by recessing a portion of the at least one partition member such that at least a portion of the coupling member is inserted thereinto.

4. The battery module of claim 3, wherein the at least one partition member comprises at least two partition members, and
wherein the coupling member is disposed between the at least two partition members.

5. The battery module of claim 4, wherein the exterior part is inserted into the coupling portion formed in a first partition member of the at least two partition members, and
the interior part is inserted into the coupling portion formed in a second partition member among the at least two partition members.

6. The battery module of claim 4, wherein, when the at least two partition members are arranged in contact with each other, a first portion of the coupling member is inserted into the coupling portion of a first partition member of the at least two partition members, and a second portion of the coupling member is inserted into the coupling portion of a second partition member of the at least two partition members.

7. The battery module of claim 1, wherein the at least one partition member comprises an extension configured to protrude from an end of the at least one partition member in an extension direction.

8. The battery module of claim 7, wherein the at least one partition member comprises a fixing groove configured such that a first end of the extension is inserted in the extension direction, and
wherein the extension is configured such that a portion of the extension is slidable while being inserted into the fixing groove.

9. The battery module of claim 7, wherein at least one of the upper cover and the upper case comprises an insertion groove configured such that a second end of the extension in the extension direction is inserted thereinto.

10. A battery pack comprising at least one battery module of claim 1.

11. A vehicle comprising at least one battery pack of claim 10.

12. The battery module of claim 1, wherein the coupling member comprises:
an exterior part having a groove; and
an interior part having a protrusion fitting within the groove, the interior part slidable relative to the exterior part.

* * * * *